UNITED STATES PATENT OFFICE.

ROBERT TENNENT SHAW, OF NEW YORK, N. Y.

IMPROVED MODE OF SEPARATING THE FIBERS OF FLAX, HEMP, &c.

Specification forming part of Letters Patent No. 41,350, dated January 19, 1864.

*To all whom it may concern:*

Be it known that I, ROBERT TENNENT SHAW, of the city and State of New York, have invented and made a certain Improvement in Separating the Fibers of Hemp, Flax, &c.; and I do hereby declare the following to be a full, clear, and exact description of the said invention and of the mode of employing the same.

I take flax, hemp, or similar vegetable material containing the fiber to be separated and immerse the same in an alkaline solution, which, if boiling hot, will operate much more quickly than when cold. The vegetable material is to remain in this solution only a sufficient time for the alkali to penetrate the fibrous portion, which fiber is generally on the outside. I then remove the fiber and wash the same in water, which water may afterward be used by the addition thereto of alkali, so as to save the alkaline solution that adheres to the material. I next expose the same to the action of chlorine, either in the gaseous form or as a solution of the bleaching-salts. The action of the chlorine and alkali upon the vegetable fiber is such that it is loose and free to be separated from the woody and foreign matter by any of the known breaking or cleaning mechanisms, and the fiber may be carded or otherwise worked.

I have also discovered that by saturating the fibers with coal-oil, naphtha, or similar products the same become of a slight curved or twisted form, resembling wool, which greatly facilitates the operations of carding, spinning, &c., and the said oil causes the fibers to adhere together, but freely draw out lengthwise in the process of manufacture. The coal-oil may be applied to the fiber after its separation from the woody portions, or before that takes place.

The alkali employed should be caustic potash, as being the most speedy in its action; but I do not limit myself in this particular, but intend to employ any other alkali that will effect the desired object.

The process before described appears to act on the vegetable matter in the following manner: The alkali combines with, permeates, and softens the silica and resinous matter by which the fibers are held together, and the chlorine forms such a compound with said silica, resinous materials, and alkali that the adhesive properties of these substances are destroyed and the fiber is free to be separated while either wet or dry.

What I claim, and desire to secure by Letters Patent, is—

1. The process of treating vegetable fiber for its separation by alkali and chlorine, substantially as specified.

2. Moistening vegetable fiber with coal-oil or its products previous to the operations of carding, spinning, or otherwise manufacturing, for the puposes specified.

In witness whereof I have hereunto set my signature this 18th day of November, 1863.

R. TENNENT SHAW.

Witnesses:
  LEMUEL W. SERRELL,
  CHAS. H. SMITH.